(12) United States Patent
Bostbarge

(10) Patent No.: US 7,244,211 B2
(45) Date of Patent: Jul. 17, 2007

(54) DIFFERENTIAL AND METHOD OF ASSEMBLY THEREOF

(75) Inventor: Guy Bostbarge, Domerat (FR)

(73) Assignee: Ateliers Mecaniques et Industries Speciales, Montlucon (FR)

( * ) Notice: Subject to any disclaimer, the term of this patent is extended or adjusted under 35 U.S.C. 154(b) by 52 days.

(21) Appl. No.: 10/491,169

(22) PCT Filed: Oct. 11, 2002

(86) PCT No.: PCT/FR02/03486

§ 371 (c)(1),
(2), (4) Date: Sep. 30, 2004

(87) PCT Pub. No.: WO03/031843

PCT Pub. Date: Apr. 17, 2003

(65) Prior Publication Data

US 2005/0037888 A1   Feb. 17, 2005

(30) Foreign Application Priority Data

Oct. 12, 2001 (FR) .................................. 01 13205

(51) Int. Cl.
*F16H 48/06* (2006.01)
(52) U.S. Cl. ...................... 475/230; 475/220; 475/331; 74/606 R; 74/607; 29/428
(58) Field of Classification Search ................. 475/220, 475/230, 331; 74/606 R, 607; 29/428
See application file for complete search history.

(56) References Cited

U.S. PATENT DOCUMENTS

| | | | |
|---|---|---|---|
| 3,202,466 A | 8/1965 | Kaptur | |
| 3,872,741 A | 3/1975 | Berchtold et al. | |
| 5,293,686 A | 3/1994 | Martin et al. | ............... 29/893.1 |
| 5,806,371 A | 9/1998 | Hibbler et al. | |
| 6,045,479 A * | 4/2000 | Victoria et al. | ............. 475/230 |
| 6,061,907 A * | 5/2000 | Victoria et al. | ............. 29/893.1 |
| 6,398,689 B1 * | 6/2002 | Morse et al. | ............... 475/230 |
| 6,715,536 B1 * | 4/2004 | Jensen | ......................... 164/235 |
| 6,883,235 B2 * | 4/2005 | Bell | ........................ 29/893.1 |
| 2005/0020397 A1 * | 1/2005 | Santelli | ...................... 475/230 |

FOREIGN PATENT DOCUMENTS

| | | |
|---|---|---|
| GB | 1280670 | 7/1972 |
| JP | 58211053 | 12/1983 |
| JP | 58211053 A * | 12/1983 |
| JP | 9-292004 | 11/1997 |

OTHER PUBLICATIONS

European Patent Office translation of Patent Abstract for Japanese Patent 58 211053, 1 page.

* cited by examiner

*Primary Examiner*—David D. Le
(74) *Attorney, Agent, or Firm*—Dowell & Dowell, P.C.

(57) ABSTRACT

A differential including axle pinions and pinion gears and a body having two parts between which the pinions are mounted. The two parts of the body are provided with complementary guiding surfaces for guiding the two parts in adjustment relative to one another along an input and output axis. One of the two parts includes at least two inner guides for slidably and adjustably mounting a rotatable assembly pin of the pinion gears such that when a relative position of the two parts is adjusted, an axial play of at least the axle pinions or a differential drag torque is adjusted afterwhich the two parts are locked relative to each other.

10 Claims, 3 Drawing Sheets

DIFFERENTIAL AND METHOD OF ASSEMBLY THEREOF

BACKGROUND OF THE INVENTION

The present invention relates to differentials of which the body, inside which are mounted the axle pinions and the pinion gears, is in two parts. More precisely, it relates to this body, to a differential comprising this body, as well as to a method for assembling this differential.

DESCRIPTION OF THE RELATED ART

A known differential comprises two substantially symmetrical half-shells. The latter, once assembled by clamping one against the other, form the body of the differential and jointly define a housing containing in particular two axle pinions, two pinion gears and two pierced dish elements, each disposed between one of the axle pinions and the body of the differential. Due to the manufacturing tolerance of the parts constituting this differential, an adjustment of the play between its gears is provided during assembly thereof. To that end, a plurality of dish elements of different thicknesses are successively mounted until those which enable the desired adjustment to be obtained have been found. Apart from being tedious, this manner of proceeding is long and must be carried out manually.

Patent document JP-58 211053 describes a differential, in a cage of which are screwed a first and a second tubular element. The adjustment of the play inside this differential requires adjusting both the position of the first tubular element and that of the second tubular element.

SUMMARY OF THE INVENTION

The invention therefore has for its object to facilitate the adjustment of a play inside a differential and/or the drag torque of this differential.

Within its meaning to be understood here, the drag torque of a differential is the torque which must be exerted on one of its axle pinions to drive this axle pinion when, the other axle pinion being free to rotate, the body of the differential is immobilized. As will have been understood, the drag torque depends in particular on the plays inside the differential.

For the purpose of attaining the object set forth hereinabove, the invention relates to a differential body inside which are intended to be mounted two axle pinions and at least two pinion gears, each in mesh with the two axle pinions, this body comprising first and second parts intended to be assembled, these first and second parts comprising complementary guiding means adapted to guide them in relative approach and removal along the axis of rotation of the differential, characterized in that the first part comprises at least two inner guides for slidably mounting at least one pin for rotatable assembly of at least one of the pinion gears, each of these two guides joining two points offset from each other in a direction parallel to the axis of rotation of the differential.

The invention also has for its object a differential comprising at least two axle pinions, two pinion gears, each in mesh with the two axle pinions, and a body inside which are mounted the axle pinions and the pinion gears. The body including assembled first and second parts and at least one pin for rotatable assembly of the pinion gears being mounted to slide relative to the first part. The relative position of the first and second parts being adjusted so that the axle pinions have a predetermined axial play or so that the differential has a predetermined drag torque. The first and second parts being locked in this adjusted relative position.

Moreover, the invention has for an object a method for assembling the differential as defined hereinabove, characterized in that it comprises at least the steps in which:

a) at least the axle pinions and the pinion gears are disposed between the first and second parts;

b) the relative position of said first and second parts is adjusted so as to adjust the axial play of at least one of the axle pinions or the drag torque of the differential, and c) the first and second parts are locked in the position determined during step b.

BRIEF DESCRIPTION OF THE DRAWINGS

The invention will be more readily understood on reading the following description, given solely by way of example and made with reference to the accompanying drawings, in which.

DESCRIPTION OF THE PREFERRED EMBODIMENT

Figure 1:
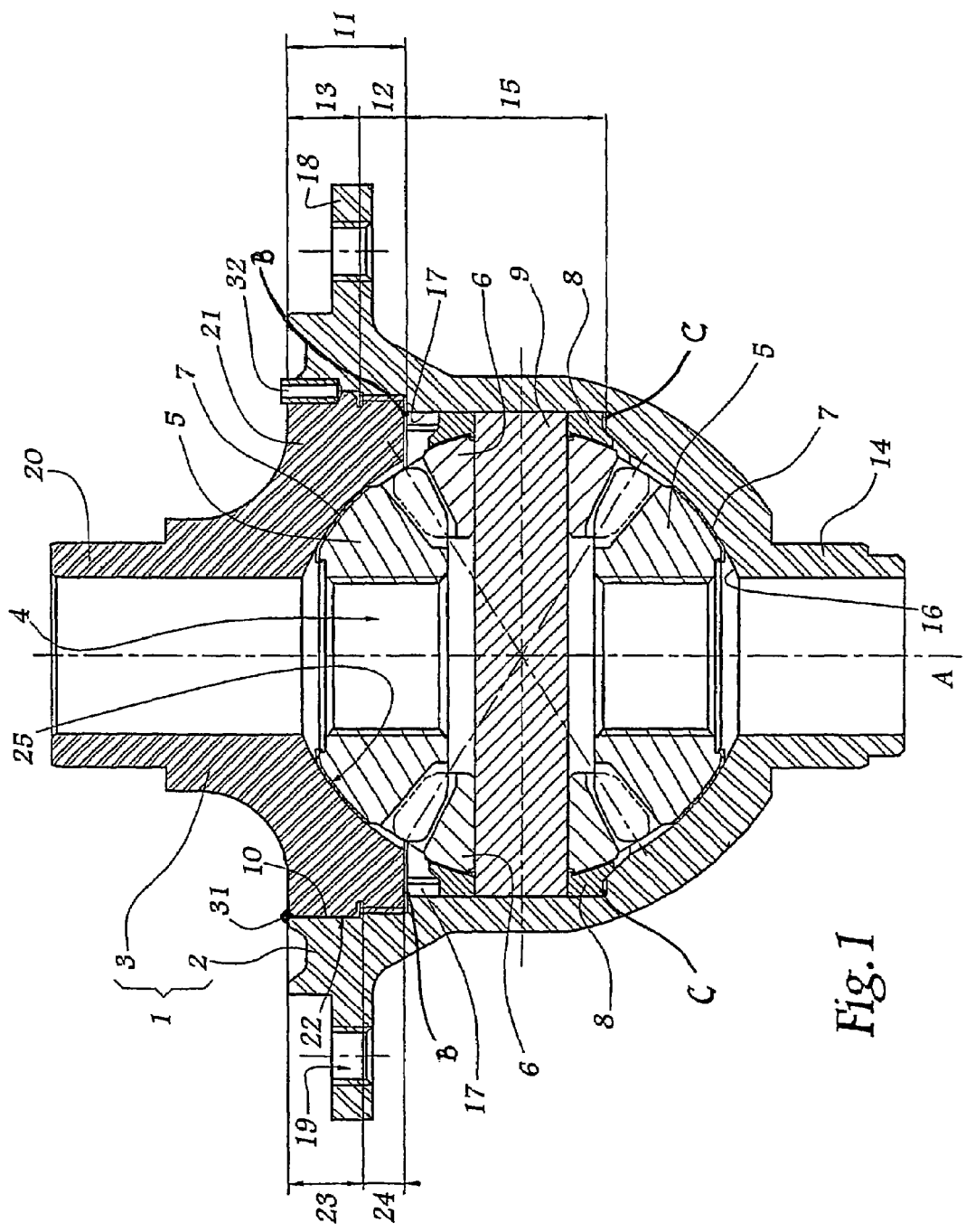
FIG. 1 is a view in axial section of a differential according to the invention.

FIG. 1 shows a differential which is according to the invention and comprises a body 1 in two parts, namely a cage 2 and an obturator 3. In this body 1, which defines an inner housing 4, there are mounted two axle pinions 5, two pinion gears 6, two anti-friction dish elements 7 disposed opposite each other, two sliding dish elements 8 likewise disposed opposite each other and an assembly pin 9 which is engaged in the sliding dish elements 8 and bears the pinion gears 6.

Figure 2:
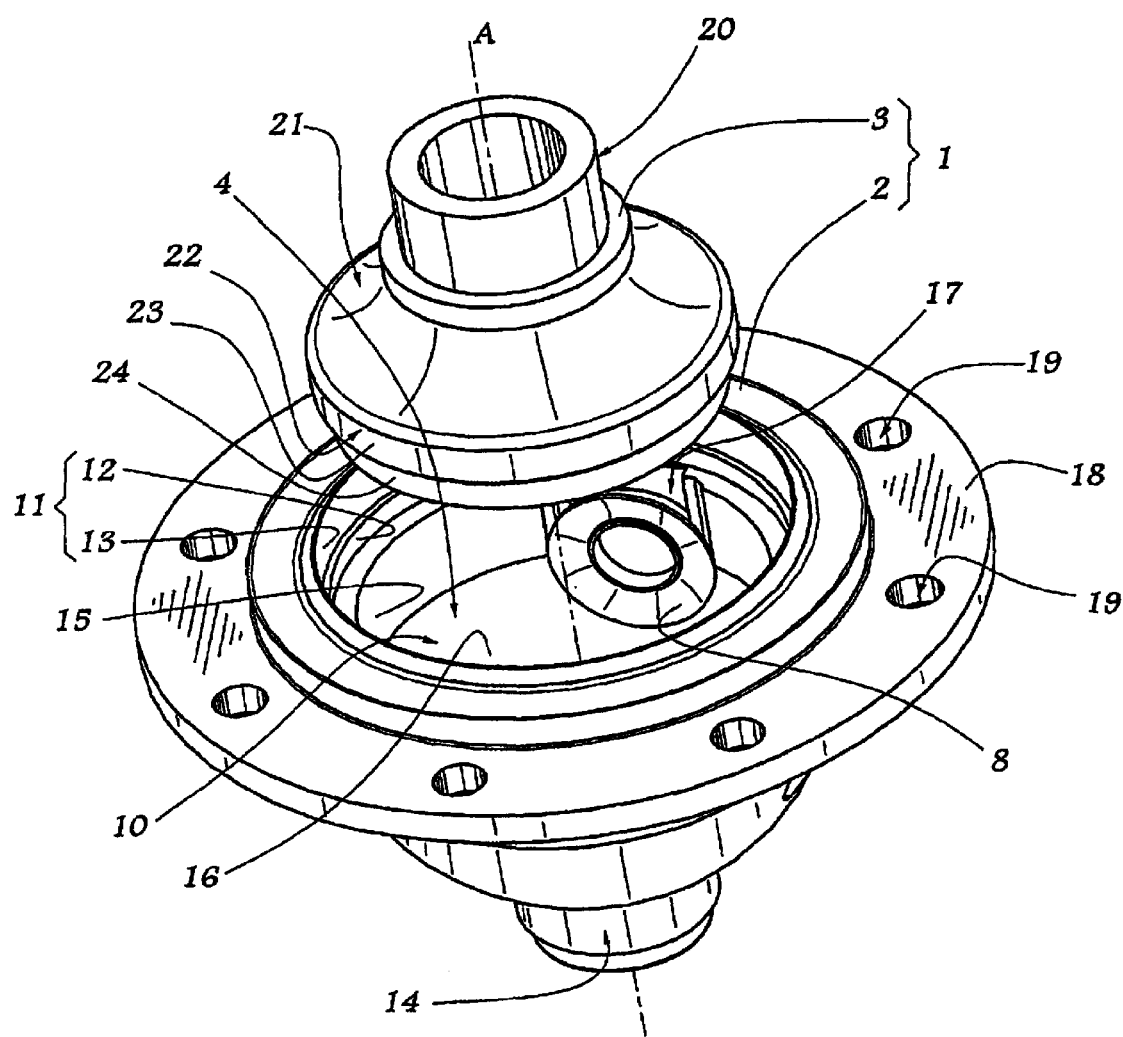
FIG. 2 is an exploded view, in perspective, and represents the body, in two parts one and the other according to the invention, of the differential of FIG. 1, one of these two parts being provided with two dish elements constituent of the differential.

As may also be seen in FIG. 2, the cage 2 is substantially in the form of a solid of revolution which has axis A of rotation of the differential as axis of revolution. It essentially defines the inner housing 4 and comprises an opening 10 for access to this housing 4. This opening 10 is defined by an end portion 11 of the inner surface of the cage 2. This end portion 11, which has a circular section, is machined and forms guiding means. It comprises two adjacent portions of which one is disposed more deeply than the other and referenced 12, and of which the other is referenced 13. Portion 12 is tapped, while portion 13 is bored.

Beyond the inner housing 4, the cage 2 extends in a tubular portion 14 which is disposed and directed opposite the access opening 10, and which is provided for the passage of a transmission shaft (not shown) intended to be coupled to one of the axle pinions 5.

Between the end portion 11 and the tubular portion 14, the inner surface of the cage 2 includes substantially cylindrical portion 15 adjacent the end portion 11, then it terminates in a bottom surface 16, which, for its part, is concave and substantially spherical. In the portion 15, two inner grooves 17 are provided, disposed opposite and substantially axial. Each of these grooves 17, of which the respective bottoms and sides are planar, forms a guide in which is slidably mounted one of the two dish elements 8. The grooves extend between two points "B" and "C" that are offset with each other in a direction that is parallel to the Axis "A" of rotation or the input and output axis of the differential.

In the vicinity of its access opening 10, the cage 2 comprises an outer, radial ring 18 which forms a flange for fixing by clamping a crown wheel (not shown) provided for drive of the differential. The radial ring 18 is pierced with holes 19 for the passage of screws (likewise not shown), for fixing the crown wheel.

The cage 2 is a forged part in one piece. It is preferably made of a light alloy such as an aluminium alloy. Except for the end portion 11, its inner surface is not machined, this compensating, at least in part, the additional costs involved by the use of forging, compared to a method of molding.

The obturator 3 is likewise substantially in the form of a solid of revolution of which the axis is the axis A of rotation of the differential. It comprises a tubular part 20 which is provided for the passage of another transmission shaft (not shown) intended to be coupled to one of the axle pinions 5. This tubular part 20 widens then extends in a thick, radial, annular cover 21.

The lateral edge of this cover 21 is defined by a cylindrical surface 22, which forms complementary guiding means of the end portion 11. Like the latter, the cylindrical surface 22 is machined and comprises a smooth portion 23 and a threaded portion 24.

The inner wall 25 of the lid 21 partly defines the inner housing 4. In its central part, it is also concave and substantially spherical.

Figure 4:
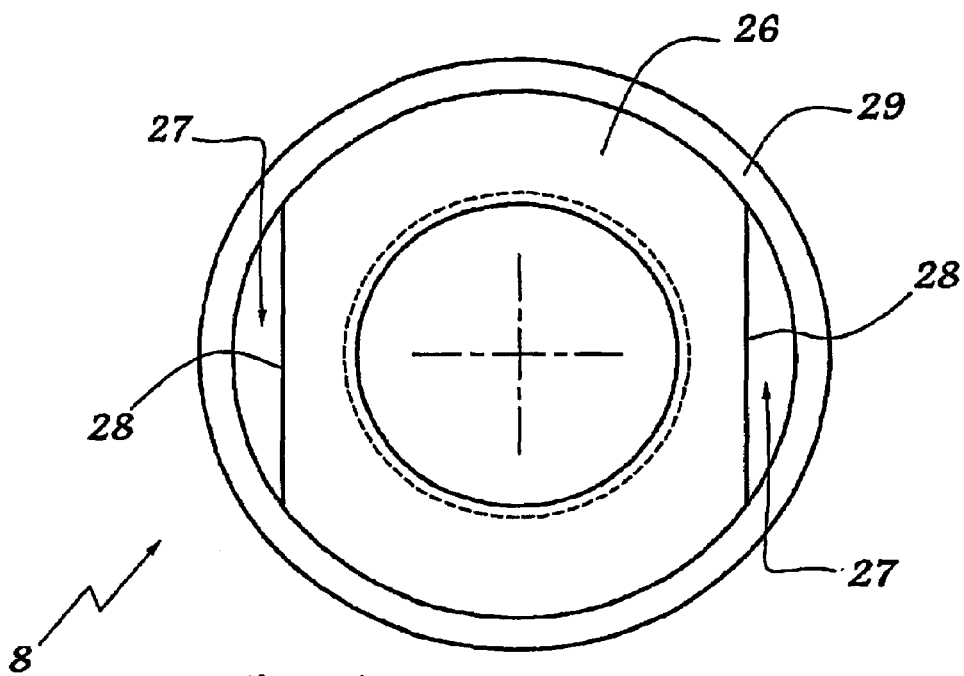
FIG. 4 shows the dish element of FIG. 3, this dish element being viewed by that of its two opposite faces which is intended to be turned outwardly.
Figure 3:
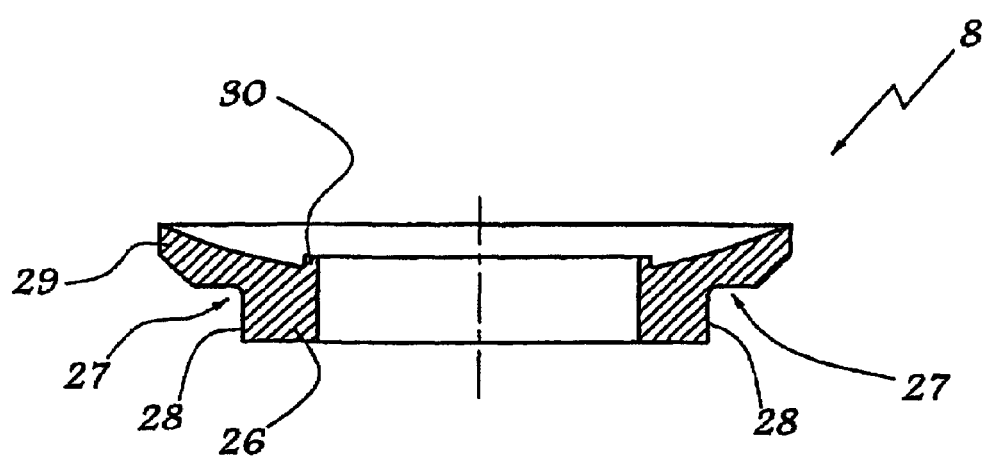
FIG. 3 is a view in axial section of one of these two constituent dish elements of the differential shown in FIG. 1.

The two sliding dish elements 8 are identical, this being translated, on the one hand, by a simplification of the assembly of the differential and, on the other hand, by a saving. One of them is shown in FIGS. 3 and 4 and is substantially annular in shape. It comprises a substantially tubular base 26, of which the inner section is circular and whose outer section is likewise circular except at the level of two rectilinear shoulders 27, parallel to each other and arranged opposite each other. The lateral faces 28 of these two shoulders 27 are intended to cooperate with the sides of the grooves 17, in order to ensure, on the one hand, guiding of the corresponding dish element 8, particularly during assembly thereof and, on the other hand, the transmission of the efforts between the cage 2 and the assembly pin 9.

The inner surface of the base 26 defines a housing for one of the ends of the assembly pin 9. In the example shown, this housing has a circular cross section so that it behaves like a bearing.

From the base 26 there widens a seat 29 for one of the pinion gears 6. The inner surface of this seat 29 is a surface of revolution which is concave and substantially spherical, and it is separated from the inner surface of the base 26 by an annular flange 30, directed along the axis of the dish element 8 and provided for centering one of the pinion gears 6.

Each dish element 8 is a part in one piece, cold-forged and made of a metal.

Each of the gears 5 and 6 is known per se and presents a conical toothing and a convex and substantially spherical outer face.

Each dish element 7 presents the shape of a plate of small thickness, pierced with a central hole for the passage of a transmission shaft and convex in the manner of a substantially spherical dome.

The assembly pin 9 is formed by a cylindrical bar of circular section.

In order to assemble the differential shown in FIG. 1, a dish element 7, then an axle pinion 5, are firstly introduced inside the cage 2.

Then, after having fitted the two pinion gears 6 and the two dish elements 8 on the assembly pin 9, the assembly thus formed is engaged in the housing 4, taking care to place the bases 26 of the elements 8 in the grooves 17. This assembly is then pushed towards the bottom of the cage 2, by simultaneously sliding one and the other dish elements 8 in the guides formed by the grooves 17. It will be noted to what point the pinion gears 6, the assembly pin 9 and the two dish elements 8 are easily and rapidly mounted, insofar as they are all positioned at the same time. The step being described is terminated once the other axle pinion 5 and the other dish element 7 have also been disposed inside the cage 2, and the obturator 3 has been pre-positioned at the level of the access opening 10.

The step of adjusting the drag torque of the differential or of the play, along axis A, of the mechanism inside the body 1 then begins. This adjustment is effected by screwing the cover 21 more or less deeply in the cage 2, which may be effected by an automat acting from a continuous measurement or from successive measurements of the drag torque. In a variant, it is possible to proceed in the following manner: one begins by screwing the obturator 3 in the cage 2 completely, i.e. until they come into abutment, then this obturator 3 is unscrewed by a quantity corresponding to the desired play. It will be noted that the threaded portions 12 and 24 in cooperation form means for adjusting with precision the relative position, in approach-removal along axis A, of the cage 2 and of the obturator 3. As the assembly pin 9 is mounted to slide along axis A, with the aid of the dish elements 8, it is positioned by itself inside the cage 2, with the result that the axial plays of the two axle pinions 5 are adjusted simultaneously in one operation.

Once the relative position of the cage 2 and of the obturator 3 is adjusted, these latter are immobilized with respect to each other with the aid of locking means which, in the example shown, are formed by a welding bead 31 arranged along the edge of the cover 21, as well as by a pin 32 inserted by force in a hole pierced both in the cage 2 and the obturator 3, where the end portion 11 and the cylindrical surface 22 cooperate.

The adjustment and assembly which have just been described are particularly simple and rapid to carry out, in accordance with the object that the invention intends to attain.

Moreover, contrary to the prior art mentioned in the introduction, it is not necessary to manufacture, manage and store a whole set of dish elements of different thicknesses.

In addition, the adjustment of the play or of the drag torque may be automated.

FIG. 1 shows the differential as arranged when all the steps for assembly described previously have been carried out. The cage 2 and the obturator 3 are in that case rigidly associated coaxially. They retain therebetween, with reduced play in the direction defined by axis A, the whole mechanism and in particular the axle pinions 5. The pin 9, on which the pinion gears 6 are idly mounted, is therefore common to the latter, this simplifying the assembly of the differential and giving the whole an increased rigidity. The shape of the seats 29 of the dish elements 8 is such that it promotes the rotation of the pinion gears 6, just like the anti-friction dish elements 7 promote the rotation of the axle pinions 5. These anti-friction dish elements 7 are all the more useful as the surfaces of the body 1 on which they are applied are not machined.

The invention is not limited to the form of embodiment described hereinbefore.

In particular, one of the two locking means constituted by the welding bead 31 and the pin 32 may be eliminated, while retaining the other. Moreover, these locking means may be replaced or completed by others, such as for example a threaded ring, clamped against the cover 21 by screwing in the cage 2, in the manner of a counter-nut. The desired locking may also be obtained by crimping the cage 2 on the obturator 3 or by adhesion.

Moreover, although the differential described hereinbefore by way of example comprises only two pinion gears 6, a differential which presents more of them, for example three or four, does not depart from the scope of the invention.

With respect to the known differentials in which no adjustment of the drag torque is effected, a differential according to the invention presents improved operational performances.

The invention claimed is:

1. A differential body comprising first and second parts inside which are mounted two axle pinions that are in mesh with at least two pinion gears, each of the first and second parts including complementary portions that are adapted to guide them as they are moved toward or away from one another along an input and output axis (A) of the differential, said first part including at least two inner guides, a pin on which the pinion gears are mounted, each of the two inner guides extending between two points B and C that are offset from each other in a direction parallel to the input and output axis (A) of the differential, the pin being freely slidable along the two inner guides as the first and second parts of the differential body are assembled, the first and second parts further including means for adjusting a relative position of the first and second parts relative to one another in assembled relationship, and the means for adjusting including a threading and a tapping which are complementary to one another and which are provided on at least a portion of the complementary guide portions of the first and second parts.

2. The differential body of claim 1, wherein the first part has a shape of a cage defining a housing for the axle pinions and pinion gears, the cage including an opening for access into the housing, the opening being obturated by the second part.

3. The differential body of claim 2, wherein the first part is a forged piece having inner surfaces which defined the housing which are free of machining marks.

4. A method for assembling a differential comprising at least two axial pinions, two pinion gears in mesh with the two axle pinions, a body having first and second parts defining a housing inside which are mounted the axle pinions and the pinion gears, each of the first and second parts including complementary portions that are adapted to guide them as they are moved toward or away from one another along an input and output axis (A) of the differential, a pin on which the pinion gears are mounted, means for mounting the pin to slide within the housing, the first and second parts further including means for adjusting a relative position of the first and second parts relative to one another in assembled relationship so that the axle pinions have a predetermined axial play or so that the differential has a predetermined drag torque and the means for adjusting including a threading and a tapping which are complementary to one another and which are provided on at least a portion of the complementary guide portions of the first and second parts, and means for locking the first and second parts in an adjusted position, the method including at least the steps of:
   a) placing the at least two axle pinions and the pinion gears mounted on the pin between the first and second parts;
   b) adjusting the relative position of the first and second parts by relative rotation of the means for adjusting so as to adjust an axial play of at least one of the axle pinions or the drag torque of the differential, and
   c) locking the first and second parts in the position determined during step b).

5. The method for assembly according to claim 4, wherein as part of step a), slidably mounting the pin inside the first part.

6. A differential comprising at least two axle pinions, two pinion gears in mesh with the two axle pinions, a body having first and second parts defining a housing inside which are mounted the axle pinions and the pinion gears, each of said first and second parts including complementary portions that are adapted to guide them as they are moved toward or away from one another along an input and output axis (A) of the differential, said first part including at least two inner guides, a pin on which the pinion gears are mounted, each of the two inner guides extending between two points B and C that are offset from each other in a direction parallel to the input and output axis (A) of the differential, the pin being freely slidable along the two inner guides as the first and second parts of the differential body are assembled, the first and second parts further including means for adjusting a relative position of the first and second parts relative to one another in assembled relationship, the means for adjusting including a threading and a tapping which are complementary to one another and which are provided on at least a portion of the complementary guide portions of the first and second parts, the relative position of the first and second parts being adjustable as they are being assembled so that the axle pinions have a predetermined axial play or so that the differential has a predetermined drag torque, and means for locking the first and second parts in the adjusted position.

7. A differential according to claim 6, including two dish parts each defining a housing receiving an end of the pin, each of the two inner guides being in a shape of a groove in which one of the two dish parts slides.

8. A differential according to claim 6, wherein the means for locking the first and second parts in the adjusted position includes a pin element.

9. A differential according to claim 6, wherein each of the first and second parts includes an inner surface, said inner surfaces being arranged opposite one another and being substantially concave, and two anti-friction dish elements, each placed between one of the two substantially concave surfaces and a substantially convex surface of one of the axle pinions.

10. A Differential comprising at least two axle pinions which are in mesh with at least two pinion gears, a body in which the axle pinions and the pinion gears are mounted, the body including first and second parts betweem which the axle pinions and the pinion gears are mounted, each of the first and second parts including complementary portions that are adapted to guide them as they are moved toward or away from one another along an input and output axis (A) of the differential, said first part including at least two inner guides, a pin on which the pinion gears are mounted, each of the two inner guides extending between two points B and C that are offset from each other in a direction parallel to the input and output axis (A) of the differential, the pin being freely slidable along the two inner guides as the first and second parts of the differential body are assembled, the first and second parts further including means for adjusting a relative position of the first and second parts relative to one another in assembled relationship, and the means for adjusting including a threading and a tapping which are complementary to one another and which are provided on at least a portion of the complementary guide portions of the first and second parts.

* * * * *